(12) United States Patent
Vogelgesang et al.

(10) Patent No.: US 7,063,614 B2
(45) Date of Patent: Jun. 20, 2006

(54) CONTROL ARRANGEMENT FOR CROP DISCHARGING DEVICE OF AN AGRICULTURAL HARVESTING MACHINE

(75) Inventors: Claus Josef Vogelgesang, Mandelbachtal (DE); Peter Schaefer, Heusweiler/Obersalbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/795,110

(22) Filed: Mar. 5, 2004

(65) Prior Publication Data

US 2004/0173435 A1    Sep. 9, 2004

(30) Foreign Application Priority Data

Mar. 6, 2003 (DE) ................. 103 09 700

(51) Int. Cl.
*A01F 12/46* (2006.01)
(52) U.S. Cl. .................................... 460/114
(58) Field of Classification Search ............. 56/10 R, 56/10.2 A; 460/114, 115; 701/50
See application file for complete search history.

(56) References Cited

U.S. PATENT DOCUMENTS

| | | | | |
|---|---|---|---|---|
| 4,042,132 | A * | 8/1977 | Bohman et al. | 414/335 |
| 5,558,282 | A * | 9/1996 | Ameye et al. | 241/60 |
| 5,575,316 | A * | 11/1996 | Pollklas | 141/198 |
| 5,749,783 | A * | 5/1998 | Pollklas | 460/119 |
| 5,979,151 | A * | 11/1999 | Sanders et al. | 56/60 |
| 6,682,416 | B1 * | 1/2004 | Behnke et al. | 460/114 |
| 6,718,746 | B1 * | 4/2004 | Hettiger et al. | 56/11.7 |
| 2002/0095923 | A1 * | 7/2002 | Krone et al. | 56/153 |
| 2003/0037527 | A1 * | 2/2003 | Hettiger et al. | 56/16.6 |

FOREIGN PATENT DOCUMENTS

| | | | |
|---|---|---|---|
| DE | 19848127 | A | 10/1998 |
| DE | 10242164.1 | * | 9/2002 |
| EP | 0672339 | A | 3/1994 |
| EP | 0666018 | A | 1/1995 |
| EP | 1040745 | A | 3/1995 |
| EP | 0760202 | A | 7/1996 |
| EP | 1151652 | A | 4/2001 |
| EP | 1250832 | A | 3/2002 |
| EP | 1 405 55 | A | 4/2004 |
| JP | 10000015 | A | 6/1996 |

* cited by examiner

*Primary Examiner*—Árpád Fábián Kovács

(57) ABSTRACT

A crop discharging device, such as a discharge spout for a crop chopping machine, has a crop input end mounted for swiveling about an inclined upright axis and for pivoting vertically about a horizontal axis. The discharge spout also includes a vertically adjustable flap at its discharge end for directing the flow of crop from the spout. A first actuator is provided for effecting movement of the spout about the upright axis, a second actuator is provided for effecting movement of the spout about the horizontal axis and a third actuator is provided for effecting movement of the flap. A control arrangement, which includes a memory into which a preset correlation table, or the like may be loaded, is provided for automatically controlling the position of the second actuator as a function of the position of the first actuator so as to maintain a given discharge height. In the same way, the control arrangement is capable of automatically controlling the third actuator as a function of the operation of the second actuator so as to maintain a desired direction of flow of the crop from the spout during adjustment of the height of the discharge end of the spout.

6 Claims, 3 Drawing Sheets

CONTROL ARRANGEMENT FOR CROP DISCHARGING DEVICE OF AN AGRICULTURAL HARVESTING MACHINE

FIELD OF THE INVENTION

The invention relates to a crop discharging device of an agricultural harvesting machine, having a first actuator and a second actuator which are connected to an arrangement for controlling their position and are arranged to alter the position of a crop conveying part of the discharging device.

BACKGROUND OF THE INVENTION

In current practice in the harvesting of agricultural crops in the field, the harvesting machine loads the harvested material into a transport vehicle which is driven along near the harvesting machine. The transport vehicle may be, e.g., a tractor-trailer combination or a truck. The harvested material is loaded into the transport vehicle via a crop discharging device associated with the harvesting machine. E.g., if the harvester comprises a chopper, the crop discharging device may comprise a spout, and if the harvester comprises a thresher, the crop discharging device may comprise a discharge auger. As a rule the crop discharging device is attached to the harvesting machine in a manner so as to be rotatable around a vertical axis, in particular to be swingable between a rest position, in which it is oriented approximately parallel to the longitudinal axis of the harvesting machine, and an operating position in which it extends transversely to the direction of movement of the harvesting machine. Additionally, the height of the delivery end (discharge end) of the crop discharging device can be variable, as can be the position of a discharge flap (or valve) which determines the angle at which the harvested material is discharged.

In the simplest case, the position of the crop discharging device is controlled manually by the operator of the harvesting machine. A disadvantage of this is that the control of the position of the crop discharging device makes major demands on the attention of the operator.

In some types of chopper harvesters, the rotational axis of the crop discharging device is not precisely vertically oriented but is inclined at a certain angle rearward, in order to increase the range of rotatability of the crop discharging device without said device colliding with the operator's cabin. When such rotation is performed, the discharge height is changed, which is particularly disadvantageous when delivery is laterally to a transport vehicle, because after the crop discharging device is rotated one must then perform a manual height adjustment for correcting the discharge height. Analogously, according to the state of the art, manual means (non-automated) must be availed of to adjust the setting of the discharge flap, in order to maintain the direction of discharge when the crop discharging device is lowered to make way for trees or power lines.

BACKGROUND OF THE INVENTION

In EP 0,666,018 A, it was proposed to equip a harvesting machine with a device for automatic control of the position of the crop discharging device, which controller is capable of determining the position of a transporting vehicle and positioning the discharging device relative to such vehicle.

In EP 1,151,652 A and EP 1,250,832 A, it was proposed to enter a set-point value for the position of the crop discharging device into a memory device, which memory device is queryable by an input device. The crop discharging device is automatically placed in the position indicated by the retrieved data.

JP 10,000,015 A discloses a thresher wherein a swingable screw conveyor for unloading a grain container is held in a pre-stored position with the aid of sensor-controlled actuators. The number of storable positions of the discharging device is limited, however, and is insufficient for situations in which the relative positions of the harvesting machine and the transporting vehicle change.

DE 198 48 127 A describes a chopper wherein the unloading target distance can be entered via a potentiometer. The unloading target distance can be derived by depressing a pushbutton, based on information about the instantaneous settings of the crop discharging device and specification of the target height. With the aid of a parameter which represents the direction of travel of the chopper, e.g. the steering angle, the crop discharging device is controlled such that the programmed unloading target distance and programmed unloading target height are maintained. When the chopper travels through a curve, the crop discharging device is thus automatically adjusted to unload the harvested material onto the transport vehicle. However, this arrangement can only function if the transport vehicle is traveling on a predefined path, e.g. if the transport vehicle constantly travels behind the chopper or is pulled by the chopper.

SUMMARY OF THE INVENTION

The underlying problem of the present invention is to devise a crop discharging device for a harvesting machine which does not have the above-described disadvantages.

The invention proposes a crop discharging device for a harvesting machine which device has one or more conveying elements for harvested material, wherewith the position of said conveying element(s) is alterable by a first actuator and a second actuator. It is proposed that a position controlling arrangement controls the position of the second actuator depending on the position of the first actuator.

In this way, the position of the second actuator is automatically adjusted to that of the first actuator. Thus, it is not necessary for the operator to manually adjust the second actuator when the first actuator is adjusted to respond to a changed situation. This is so because the second actuator is adjusted automatically via the position controlling arrangement. In an embodiment, the controller operates electronically and the actuators are moved electromechanically or by electronically controlled means which are pneumatically or hydraulically mediated. In another embodiment, the position controlling arrangement works hydraulically, with a first master cylinder which is moved by the first actuator and controls the second actuator hydraulically.

In particular, the second actuator can be controlled such that the discharge height, i.e., the height of the outflow from the crop discharging device, is maintained when the crop discharging device is moved (e.g. rotated around the vertical axis). This embodiment is particularly advantageous if the first actuator executes a rotation around an axis which is approximately but not precisely vertical. Thus the controller compensates for the change in height of the outflow from the crop discharging device when the latter is rotated around the approximately vertical axis.

According to another embodiment or another mode of operation of the same embodiment, the controller can be operated to control the discharge direction of the crop discharging device with respect to the ground, regardless of the height of the discharge end of said discharging device.

When the crop discharging device is lowered, e.g. when passing under trees or power lines, a discharge flap on the discharge end of the discharging device is automatically adjusted so as to maintain the discharge direction, whereby the harvested material reliably reaches the transport vehicle.

The relationship between the position of the first actuator (which establishes, e.g., the rotational angle around the vertical axis or the height of the crop discharging device) and the position of the second actuator (which serves to adjust the height of said discharging device or to adjust the discharge flap) can be prescribed in a fixed manner in an electronic controller or can be entered by the operator in order to adjust these positions to the given situation, e.g. to take into account different angles of inclination and dimensions of the crop discharging device. These parameters may be changed, e.g., by a retrofit. Information may be input via a keypad or via one or more potentiometers which provide proportionality constants between the two positions and a reference point. Also, data input may occur via successive manually controlled setting of different positions of the crop discharging device, and corresponding data entry into an input device.

As a rule, the position of the first actuator is adjusted manually. However, automatic adjustment is also possible, e.g., via a device for sensing the position of the transport vehicle by sensing some feature of the transport vehicle optically or by distance sensors which employ acoustic or electromagnetic waves. Automatic adjustment can also be done by entry of information about the position of the transport vehicle and the harvesting machine generated by respective position sensors, e.g. GPS antennas (global positioning system for geolocation).

BRIEF DESCRIPTION OF THE DRAWINGS

Two exemplary embodiments are illustrated in the drawings and are described in more detail hereinbelow.

DESCRIPTION OF THE PREFERRED EMBODIMENT

Figure 1:
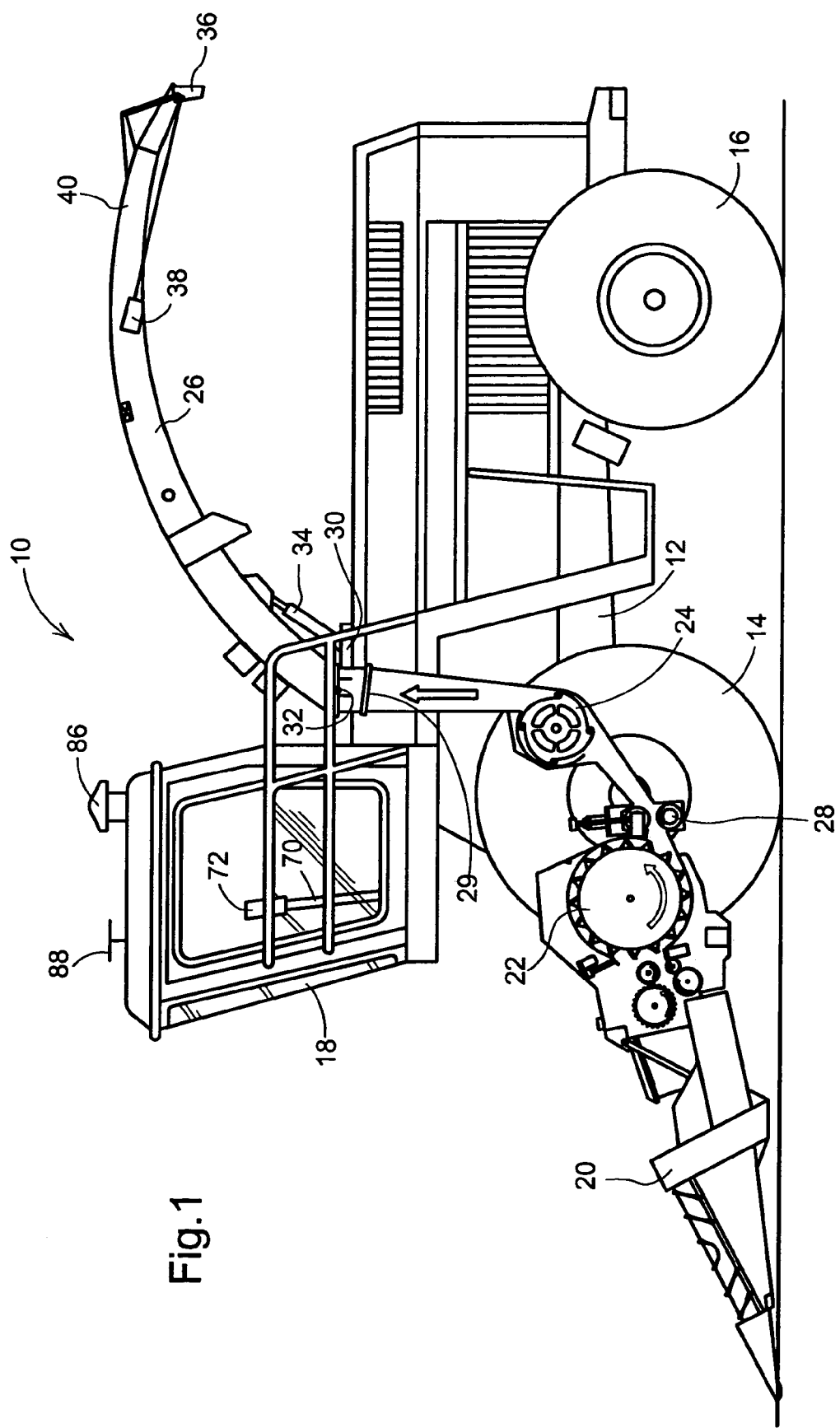
FIG. 1 is a schematic left side view of a harvesting machine of the type with which the present invention is adapted for use.

The harvesting machine 10, shown in FIG. 1 in the form of a self-propelled chopper, is comprised of a frame 12, which is borne on front wheels 14 and rear wheels 16. The harvesting machine 10 is operated from an operator's cabin 18 from which a harvested material intake device 20 is visible. The material harvested from the ground, e.g. corn, grass, or the like, is introduced to a chopping drum 22 via the intake device 20. There the harvested material is chopped into small pieces and is transferred to a conveying device 24. The harvested material passes from the harvesting machine 10 to a transport vehicle which is being driven nearby, via a crop discharging device 26 in the form of a rotatable discharge spout. A device for further fragmentation, shown here as a kernel processor 28, extends between the chopping drum 22 and the conveying device 24. The kernel processor 28 feeds the material to be conveyed tangentially to the conveying device 24.

The position of the crop discharging device 26 can be changed by three actuators 30, 34 and 38. The actuator 30 is in the form of a hydraulic motor or linear motor which serves to rotate the rotatably mounted crop discharging device 26 on a rotating track mount 29, around an approximately vertical axis. Thus the actuator 30 enables the crop discharging device 26 to be rotated rearward into the traveling position shown in FIG. 1 or to be rotated into a defined angle transversely to the forward direction of the harvesting machine 10. The axis of the track mount 29 is not precisely vertical but is inclined slightly rearward with respect to the direction of advance of the harvesting machine 10. This inclination increases the range of possible rotation of the crop discharging device 26 without collision with the operator cabin 18. The actuator 30 engages with a worm gear or a gear wheel into a sprocket fixed to the track mount 29.

The actuator 34, in the form of a hydraulic cylinder, is arranged to swing the crop discharging device 26 around a horizontal axis 32 disposed at the upstream end of the discharging device 26. The actuator 34 thus determines the height of the discharge end of the crop discharging device 26. An actuator 38, in the form of a hydraulic cylinder, serves to swing a discharge flap 36 disposed on the discharge end 40 of the crop discharging device 26. The adjustable discharge flap 36 allows setting of the angle at which the harvested material leaves the crop discharging device 26. The actuators 34 and 38 can be single-action or double-action hydraulic cylinders. In the case of a single-action hydraulic cylinder, the return movement is achieved by the respective weights of the crop discharging device 26 and of the discharge flap 36, or by the use of a return device, which may be e.g. a tensile spring or a gas-assisted tensile spring, not shown. In the embodiment illustrated, both actuators 34 and 38 are double-action. The actuator 30 can rotate the crop discharging device 26 in either direction (clockwise or counterclockwise), in successive movements. The crop discharging device 26 and the actuators 30, 34, and 38 are per se known from the state of the art (see, e.g., EP 1,040,745 A, EP 0,760,202 A, and EP 0,672,339 A).

Figure 2:
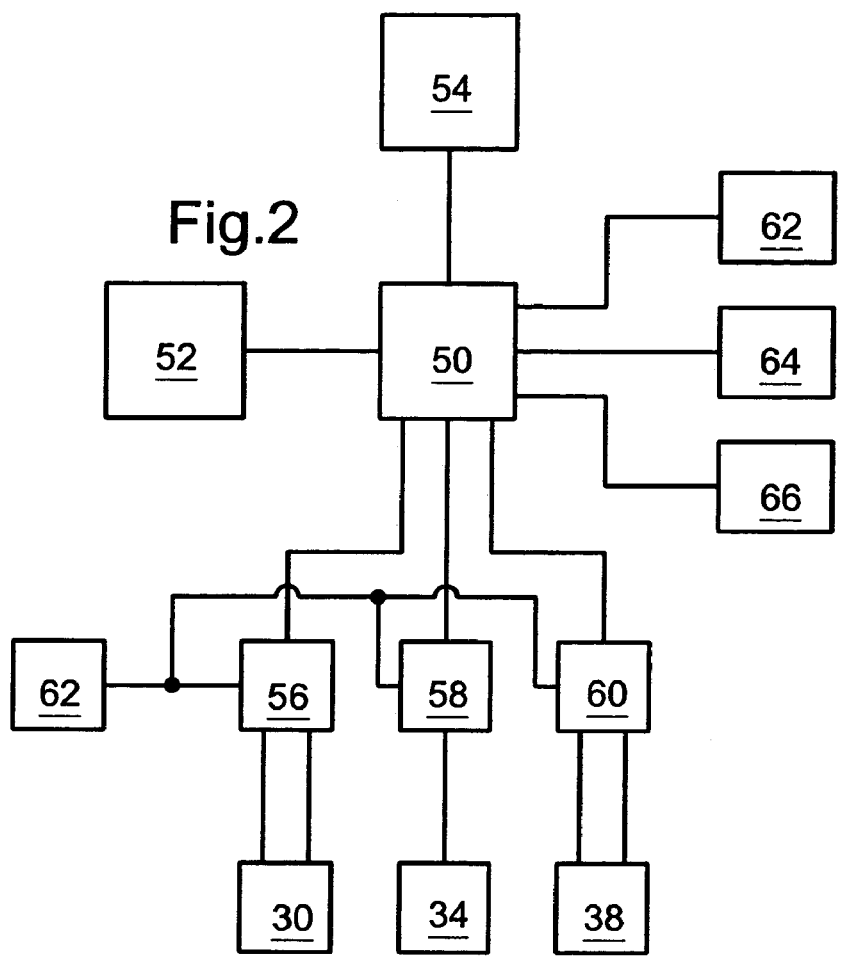
FIG. 2 is a block diagram of a controller for controlling the position of the crop discharging device of the harvesting machine.

FIG. 2 is a block diagram illustrating the architecture of a first embodiment of an apparatus for controlling the position of the crop discharging device 26. A controller 50, in the form of a microprocessor or microcontroller, is connected to an input device 52 and a memory device 54.

The controller is further connected to three electromagnetically controlled valves 56, 58 and 60, which are operationally connected on their input side in a hydraulic link to a device 62 for providing hydraulic fluid at operational pressure (e.g. a pressurized reservoir or a pump) and on their output side to the respective actuators 30, 34 and 38. The valves 56 and 60 are connected to the respective actuators 30 and 38 via dual hydraulic lines, in that the actuator 30 is a hydraulic motor which is operable in two rotational directions and the actuator 38 is a dual-action hydraulic cylinder. The actuators 30, 34 and 38 are connect to the valves 56 and 60, connected by two hydraulic lines, respectively, since the actuator 30 is a hydraulic motor operable in two rotational directions and the actuators 34 and 38 are double-action hydraulic cylinders. In this embodiment, the actuator 34 could also be a single-action cylinder.

Finally, the controller 50 is connected to three sensors 62, 64 and 66. Sensor 62 senses the position of the actuator 30 for rotating the crop discharging device 26, thereby delivering information about the momentary rotational angle of said device 26. The second sensor 64 senses the position of the actuator 34 for adjusting the height of the crop discharging device 26, thereby delivering information about the swing angle of said device 26 around the horizontal axis 32. The third sensor 66 delivers information about the position of the actuator 38 for swinging the discharge flap 36, thereby delivering information about the swing angle of said flap 36. The sensors 62, 64 and 66 are not shown in FIG. 1 but may be respectively integrated in the housings of the actuators 30, 34 and 38, or may be disposed at suitable locations away from said actuators. The sensors 62, 64 and 66 preferably are provided with analog-digital converters, so that the controller 50 receives digital data. However it is conceivable that analog values produced by the sensors 62, 64 and 66 could be supplied to the controller 50, particularly via separate lines.

As a rule the controller 50 is connected to the input device 52, the valves 56, 58 and 60, and the sensors 62, 64 and 66 via a bus, which is generally in the form of a CAN bus, which reduces wiring costs. The memory 54 may be monolithically integrated into the controller 50 or may be connected to the controller via wires. The memory 54 is non-volatile, to avoid loss of stored data when the ignition is turned off or if the battery of the harvesting machine 10 fails. A supplemental battery and/or static RAM (random access memory) may also be provided.

Figure 3:
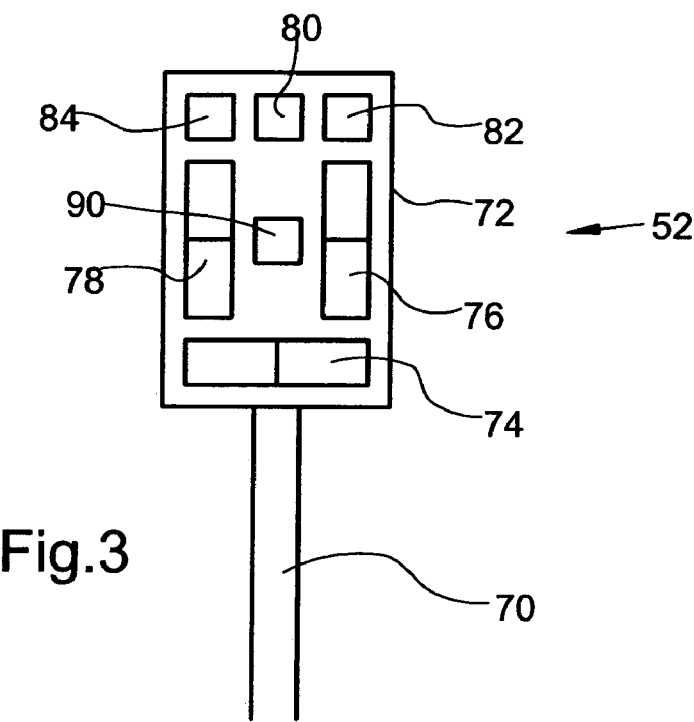
FIG. 3 is a view of a manually operable input device.

The input device 52 is shown in more detail in FIG. 3. It is in the form of a multifunction hand grip 72 which is disposed on the upper side of a swingable arm 70 which is disposed laterally next to the work station in the operator's cabin 18. By swinging the arm 70 around a horizontal swing axis located at the lower end of the arm and oriented transversely to the direction of travel of the harvesting machine 10, the operator can regulate the speed of such travel, in a known fashion.

The multifunction hand grip 72 has three rocker switches 74, 76 and 78, and three pushbutton switches 80, 82 and 84. The rocker switches and pushbutton switches are all electrically connected to the controller 50.

The first rocker switch 74 serves to actuate the actuator 30 which rotates the crop discharging device 26 around the nearly vertical axis. If the left half of the first rocker switch 74 is depressed, pressurized hydraulic fluid is supplied to actuator 30 via controller 50 and the first valve 56 such that the crop discharging device 26 is rotated in a first direction, e.g. clockwise. If analogously the right half of the first rocker switch 74 is depressed, pressurized hydraulic fluid is supplied to actuator 30 via controller 50 and the first valve 56 such that the crop discharging device 26 is rotated in the opposite direction. If the first rocker switch 74 is not actuated, the actuator 30 stays still.

The second rocker switch 76 serves to actuate the actuator 34 which serves for height adjustment. If the upper half of the second rocker switch 76 is depressed, pressurized hydraulic fluid is supplied to actuator 34 via controller 50 and the second valve 58 such that the crop discharging device is swung vertically upward around the axis 32. If analogously the lower half of the second rocker switch 76 is depressed, hydraulic fluid is removed from the actuator 34 via the controller 50 and the second valve 58, so that the crop discharging device 26 is lowered in the opposite direction. If the second rocker switch 76 is not actuated, the actuator 34 stays still.

The third rocker switch 78 serves to actuate the actuator 38 for adjusting the discharge flap 36. If the upper half of the third rocker switch 78 is depressed, pressurized hydraulic fluid is supplied to actuator 38 via controller 50 and the third valve 60 such that the discharge flap 36 is swung upward. If analogously the lower half of the third rocker switch 78 is depressed, pressurized hydraulic fluid is supplied to actuator 38 via controller 50 and the third valve 60 such that the discharge flap 36 is swung in the opposite direction. If the third rocker switch 78 is not actuated, the actuator 38 stands still.

In this manner, the three rocker switches 74, 76 and 78 enable positioning of the crop discharging device 26 such that harvested material carried by the harvesting machine 10 is delivered to a transport vehicle. Because the axis of the rotating track mount 29 is inclined rearward, when the actuator 30 is actuated with the first rocker switch 74 the height of the discharge end 40 of the crop discharging device 26 also changes, which is undesirable, particularly when the transport vehicle being filled is disposed to the side of the harvester 10. In order to solve this problem, the pushbutton switch 80 may be depressed for selecting an operating mode in which the actuator 34 (which here is serving as the second actuator) can be adjusted depending on the position of the actuator 30 (which here is serving as the first actuator). Preferably the selection of this operating mode is confirmed by a light display in the pushbutton switch 80 itself. The actuator 34 is then adjusted via the controller 50 such that the height of the discharge end 40 remains constant. For this purpose, appropriate information reflecting the relationship between the angle of the actuator 30 and the position of the actuator 34 has been input into the memory 54. In particular, this information may be in the form of tables or functions. When this mode of operation is selected by depressing the pushbutton switch 80, the height of the discharge end 40 which exists at that moment is maintained. In this way, the operator by using the rocker switch 74 can cause the crop discharging device 26 to be rotated without having to himself adjust the height of the discharge end 40 via the rocker switch 76. It is possible for this operational mode to be permanently active.

During harvesting operations, situations arise in which one needs to adjust the actuator 34 so as to lower the crop discharging device 26 below trees, power lines, or other overhanging objects. When this lowering is accomplished, the direction of discharge with respect to the ground is changed such that one cannot always ensure that the harvested material will be delivered to the transport vehicle. According to the state of the art, the operator must therefore not only depress the rocker switch 76 to lower the crop discharging device 26 via the actuator 34 but also must depress the rocker switch 78 to raise the discharge flap 36 so as to maintain approximately the same discharge direction with respect to the ground. In order to remedy this disadvantage, a second mode of operation may be selected via the pushbutton switch 82, wherewith the actuator 38 (which here is serving as the second actuator) is adjusted depending on the position of the actuator 34 (which here is serving as the first actuator). Preferably the selection of this operating mode is confirmed by a light display in the pushbutton switch 82 itself. Information is input into the memory 54 as to how the actuator 38 is to be positioned when the position of the actuator 34 is changed. As described above, this information may comprise a table or some other functional relationship. When this second mode of operation is selected via the pushbutton 82, the discharge direction of the crop discharging device 26 which exists at that moment is maintained. In this way, the operator by using the rocker switch 76 can change the height of the discharge end 40 without having to himself adjust the discharge flap 36 via the rocker switch 78. It is possible for this operational mode to be permanently active.

Both of the described operational modes can be cancelled by depressing the pushbutton switch 80 or 82, respectively, a second time. Both operational modes may be selected concurrently by depressing both switches 80 and 82. Then the position of actuator 34 will depend on that of actuator 30, and the position of actuator 38 will depend on the position of actuator 34 (which in turn depends on that of actuator 30). In all modes of operation, all actuators 30, 34 and 38 can be further adjusted via the rocker switches 74, 76 and 78 to adjust the settings of the crop discharging device 26 to changing conditions.

The third pushbutton switch 84 serves to select a certain operational mode of the memory. In this operational mode of the memory, the operator can specify at least two settings of the crop discharging device 26 via the rocker switches 74, 76 and 78 which are confirmed by depressing the pushbutton switch 80 for the first operational mode and the pushbutton switch 82 for the second operational mode. Then the instantaneous positions of the actuators 30, 34 and 38 are sensed via the sensors 62, 64 and 66, and the data in the memory 54, which serve to control the actuator 34 in the first operational mode and the actuator 38 in the second operational mode, are adjusted via the controller 50. In this manner, the controller 50 can be easily adjusted to changed conditions, such as a modification in the geometry of the crop discharging device 26.

The harvesting machine 10 is equipped with a GPS geolocation antenna 86 and a radio antenna 88. The GPS antenna 86 enables information to be provided about the position of the harvesting machine 10 in a terrestrial coordinate system. The radio antenna 88 serves to receive a position signal, also in a terrestrial coordinate system, of a transport vehicle. Using the signals from the antennas 86 and 88, a signal for automatic control of the actuators 30, 34 and 38 can be generated, so that the harvested material is automatically delivered to the transport vehicle even when that vehicle changes position relative to the harvester. A mode of operation enabling this can be selected via a switch 90. In this operational mode, at least the position of the actuator 30 is taken into account in controlling the actuator 34 in the manner described supra, in order to compensate for the rearward inclination of the axis of the rotating track mount 29. Likewise, the position of actuator 34 can be taken into account in the control of actuator 38.

Figure 4:
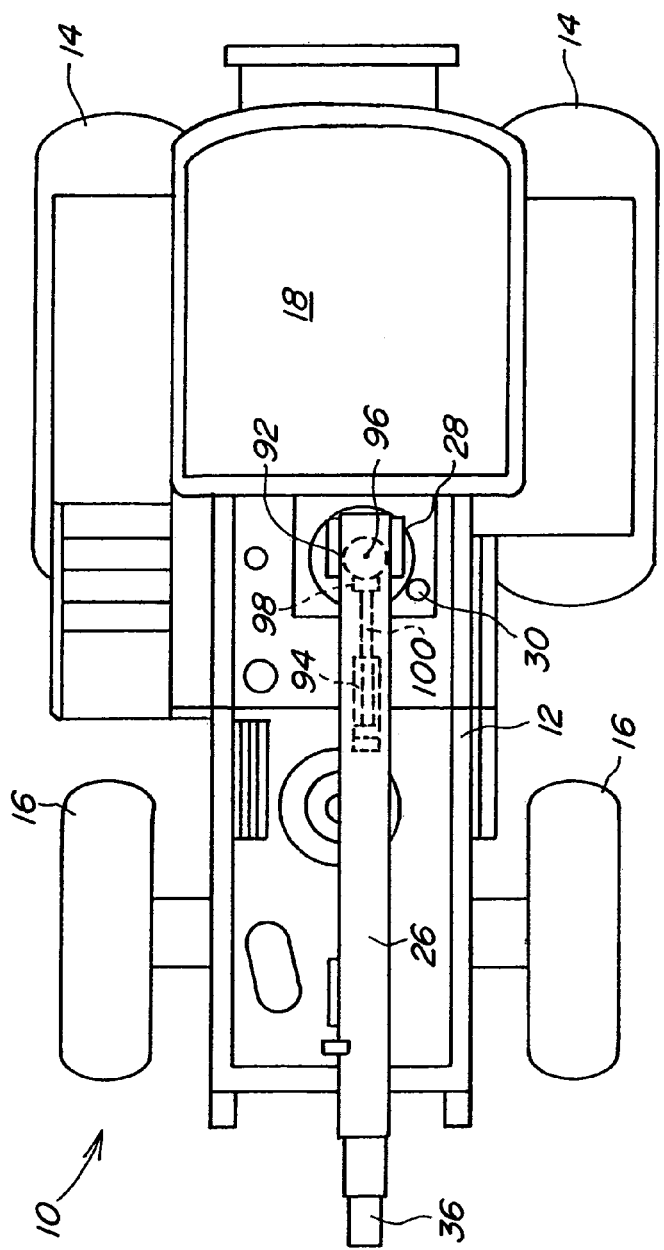
FIG. 4 is a top view of a harvesting machine having a second embodiment of a position controlling arrangement for the position of the discharge device.

FIG. 4 shows a harvesting machine in the form of a forage harvester, in which a second embodiment of an arrangement for controlling the position of the crop discharging device 26 is provided, in a top view. Elements corresponding to the first embodiment are provided with like reference numerals. At the harvesting machine 10 shown in FIG. 4, an eccentric control element 92 is arranged above the track mount 29. The control element 92 surrounds the discharging device 26 ring-shaped and rotates together with the discharging device 26. The center of the circle-cylindrical control element 92 is offset with respect to the rotational axis 96 of the discharging device 26 to the rear, thus arranged eccentric with respect to axis 96. The axis 96 is also inclined rearwards from the vertical by a small angle. In forward direction behind the axis 96, a follower element 98 abuts the control element 92. The follower element 98 is connected to the rod 100 of a master cylinder 94. The master cylinder 94 is connected to the frame 12 of the harvesting machine 10.

Figure 5:
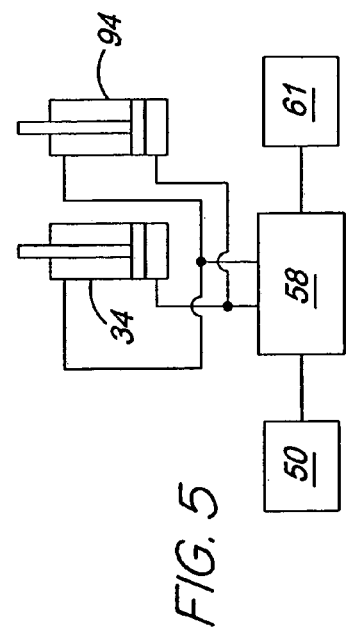
FIG. 5 is a portion of the block diagram of FIG. 2 comprising a hydraulic schematic of the embodiment from FIG. 4.

An hydraulic scheme of the arrangement for controlling position of the discharge device 26 is shown in FIG. 5. It corresponds to the respective parts in FIG. 2, except the addition of the master cylinder 94. The second valve 58 is, like in the first embodiment, connected to a controller 50, as shown in FIG. 2. The parts of controller 50, which are not shown in FIG. 5 for simplification, allow the operator to control a movement of actuators 30 and 38 by means of switches 74 and 78 and valves 56 and 60. The controller 50 also provides for a movement of actuator 34 by means of switch 76. During movement of actuator 30, the electronic control of actuator 34 for compensating the angle of the track mount 29, the electronic control described for the first embodiment is not provided.

Instead, actuator 34 is in hydraulic connection with master cylinder 94, as shown in FIG. 5. The rod chamber of the actuator 34 is connected to the rod chamber of the master cylinder 94 and the cylinder chamber of the master cylinder is connected to the cylinder chamber of actuator 34. When the actuator 30 moves, the control element 92 moves together with the discharging device 26 around axis 96. Due to the eccentricity of the control element 92 also the follower element 98 moves forwardly in the forward direction of the harvesting machine, such that the rod 100 of the master cylinder 94 moves accordingly. The further the discharging device 26 is rotated by actuator 30 forwardly from the park position shown in FIG. 4, the further the rod 100 of the master cylinder 94 is shifted forwardly. Thus, continuously fluid is moved from the rod chamber of the master cylinder 94 is moved to the rod chamber of actuator 34. Simultaneously, fluid flows from the cylinder chamber of the actuator 34 into the cylinder chamber of the master cylinder 94. The discharging device 26 is lowered the more the further the discharging device 26 is turned to the front.

The control element 92, the master cylinder 94 and the actuator 34 are dimensioned such that by the movement of the actuator 34 resulting from turning the discharging device 26 around axis 96 the inclination of axis 96 is compensated. The outer end of the crop discharging device 26 thus moves on a horizontal path. In this embodiment, it is possible to dispense with switch 80 since the height compensation is permanently active due to the hydraulic control. It would also be possible to dispense with sensors 62, 64, and 66. In another embodiment, the control element 92 could also be shaped such that it only moves the master cylinder 94 when the discharging device 26 is on a predetermined side of the harvesting machine 10, e.g. the left side. A height compensation happens then only when the discharge device 26 is on this side, which preferably corresponds to the side on which most containers are to be filled. An analogously working control of actuator 38 based on a master cylinder moved by actuator 34 would also be possible, in order to adjust the discharge direction. There, the cylinder chambers would have to be connected with the rod chambers of the other cylinder.

Due to the mass of the discharging device 26, the cylinder chambers of the actuator 34 and the master cylinder 94 are under a certain pressure, such that the follower element 98 provides a pressure upon the control element 92, thus a torque upon the discharging device 26 results, at least as long as it is not arranged in the longitudinal direction. This pressure also serves to keep the follower element 98 in abutment with the control element 92. For relief of the actuator 30, the track mount 29 can be self-arresting in a known manner.

The invention may also be employed for threshers having swingable and height-adjustable screw conveyors for loading grain containers, especially when the swing axis is non-vertical.

Having described the preferred embodiment, it will become apparent that various modifications can be made without departing from the scope of the invention as defined in the accompanying claims.

The invention claimed is:

1. In an agricultural harvesting machine including a crop discharging device comprising a spout having an inlet end mounted for swinging about an upright axis, tilted slightly in a rearward direction relative to a forward direction of movement of said harvesting machine, and also for pivoting about a horizontal axis, a first actuator for selectively effecting movement of said spout about said upright axis so as to adjust a height of a discharge end of said spout, and a second actuator for selectively effecting movement of said spout about said horizontal axis, and a control arrangement being coupled to said first actuator and to said second actuator, the improvement comprising: said control arrangement being operable for altering the position of said second actuator as a function of the position of said first actuator such that said discharge end of said spout is maintained at a substantially constant height as said spout is swung about said upright axis by said first actuator.

2. The agricultural harvesting machine, as defined in claim 1, wherein said control arrangement is operable such that said relationship between the position of said first actuator and the position of said second actuator is prescribed in an electronic controller in one of an automated fixed manner or by input by a user.

3. The agricultural harvesting machine, as defined in claim 2, wherein said control arrangement includes a computer having a memory; and the relationship between any given position of said first actuator and said second actuator being manually input into said memory.

4. The agricultural harvesting machine, as defined in claim 1, wherein said control arrangement is such that the position of the first actuator can be controlled in an electronic controller either manually or automatically.

5. The agricultural harvesting machine, as defined in claim 1, wherein a master cylinder is moved by the first actuator and the master cylinder is in hydraulic connection with the second actuator.

6. In an agricultural harvesting machine including a crop discharging device comprising a spout having an inlet end mounted for swinging about an upright axis and also for pivoting about a horizontal axis, a first actuator for selectively effecting movement of said spout about said upright axis, a second actuator for selectively effecting movement of said spout about said horizontal axis so as to adjust a height of a discharge end of said spout, a discharge flap being coupled to said discharge end for movement about a second horizontal axis, a third actuator for selectively effecting movement of said flap about said second horizontal axis, and a control arrangement being coupled to said first actuator, to said second actuator and to said third actuator, the improvement comprising: said control arrangement being operable for automatically altering the position of said second actuator, as a function of the position of the first actuator, and for automatically altering the position of said third actuator as a function of the position of said second actuator so as to move said flap so as to maintain substantially constant a direction of discharge of material from said discharge end of said spout when said second actuator is actuated so as to change a height of said discharge end of said spout from ground level.

* * * * *